US007000814B2

(12) United States Patent
Wang

(10) Patent No.: US 7,000,814 B2
(45) Date of Patent: Feb. 21, 2006

(54) SECURING DEVICE FOR BICYCLE RACK ON VEHICLE

(76) Inventor: Chiu-Kuei Wang, No. 42, 4 Lin, Shin-Fuh Lee, Yuan-Li Town, Miao-Lih Hsien (TW)

( * ) Notice: Subject to any disclaimer, the term of this patent is extended or adjusted under 35 U.S.C. 154(b) by 0 days.

(21) Appl. No.: 10/805,187

(22) Filed: Mar. 22, 2004

(65) Prior Publication Data

US 2005/0205629 A1 Sep. 22, 2005

(51) Int. Cl.
*B60R 11/00* (2006.01)

(52) U.S. Cl. ...................... 224/520; 224/497; 224/558; 224/924

(58) Field of Classification Search ................ 224/519, 224/520, 515, 924, 558, 401, 496, 497, 499; 280/415.1, 416.1, 477, 511, 495
See application file for complete search history.

(56) References Cited

U.S. PATENT DOCUMENTS

2004/0256429 A1 * 12/2004 Wang ......................... 224/497

* cited by examiner

*Primary Examiner*—Stephen K. Cronin
(74) *Attorney, Agent, or Firm*—Rosenberg, Klein & Lee

(57) ABSTRACT

A bicycle rack includes two tubes each have a support bar at a first end thereof for supporting bicycles thereon and a positioning member is connected to an inside of a second end of each of the first and second tubes. The extension part from a vehicle is clamped between the two positioning members and a sphere is connected to the extension part. A retaining member is connected between the first and second tubes and includes a collar so as to embrace the sphere. A ring is connected to a first tube and a holding member is pivotably connected to the second tube, the holding member includes a hook portion which is disengageably hooked by the ring. The contact area of the bicycle rack and the extension part and the sphere is large enough to reduce shaking during transportation.

2 Claims, 8 Drawing Sheets

SECURING DEVICE FOR BICYCLE RACK ON VEHICLE

FIELD OF THE INVENTION

The present invention relates to a securing device for preventing the bicycle rack from shaking.

BACKGROUND OF THE INVENTION

A conventional bicycle rack is disclosed in FIGS. 6 and 7, and generally includes two tubes 61 including two sections which are connected with each other at angle. Two support bars 60 are respectively connected to the two tubes 61 for supporting bicycles thereon and two stretch plates 64 are connected between the two tubes 61 so as t o maintain the wide-open position of the rack. A locking device 65 locks the two stretch plates to avoid from being folded or collapsed. A connection device 62 includes two cups 63 which are connected to two respective insides of the two tubes 61 and each cup 63 has a recess 631 so as to embrace a sphere 70 connected to the vehicle. It is noted that there is a gap between the two cups 63 and the sphere 70 so that the rack shakes during transportation. In order to improve the shortcoming, a securing device 66 is disclosed in applicant's former patent application U.S. patent application Ser. No. 10/600,459, and includes a holding member 662 which is pivotably connected one of the two tubes 61 and has a hook portion at one end and a bolt 663 extends through the other end of the securing device 66. A ring 661 is pivotably connected to the other tube and is engaged with the hook portion of the holding member 62. The bolt 663 pushes the hook portion to be securely connected to the ring 661 so as to pull the two cups 63 together. Although the two cups 63 are pulled together by the securing device 66, the load of the bicycles on the supporting bars 60 which are located at a distance from the cups 63 shakes the two cups 63 and makes a lot of noise at the position where the two cups 63 clamp the sphere 70.

The present invention intends to provide a securing device for a bicycle rack wherein the sphere and the base for connecting the sphere are well secured so as to reduce the shaking during transportation.

SUMMARY OF THE INVENTION

The present invention relates to a bicycle rack connected to an extension part from a vehicle and a sphere is connected to the extension part. The bicycle rack comprises a first tubes and a second tube Each of the first and second tubes has a support bar extending from a first end thereof and a positioning member is connected to an inside of a second end thereof. The two positioning members engage with the extension part. A ring is pivotably connected to the second end of the first tube. A retaining member is connected between the first and second tubes and includes a collar which embraces the sphere. A holding member has an intermediate point pivotably connected to the second tube and the ring is disengageably hooked to a hook portion at an end of the holding member. A bolt extends through the other end of the holding member.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
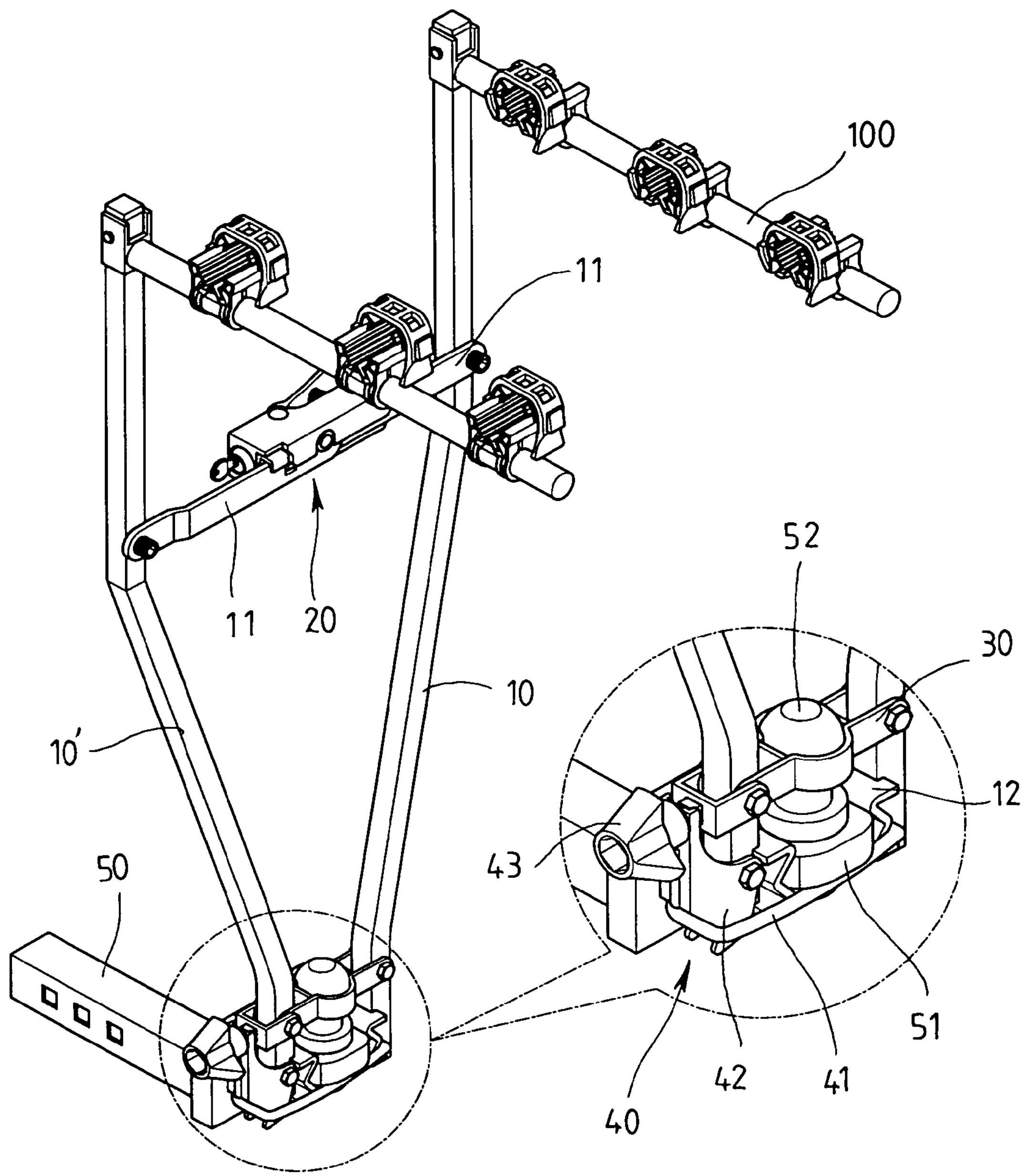
FIG. 1 is a perspective view to show the bicycle rack of the present invention.
Figure 2:
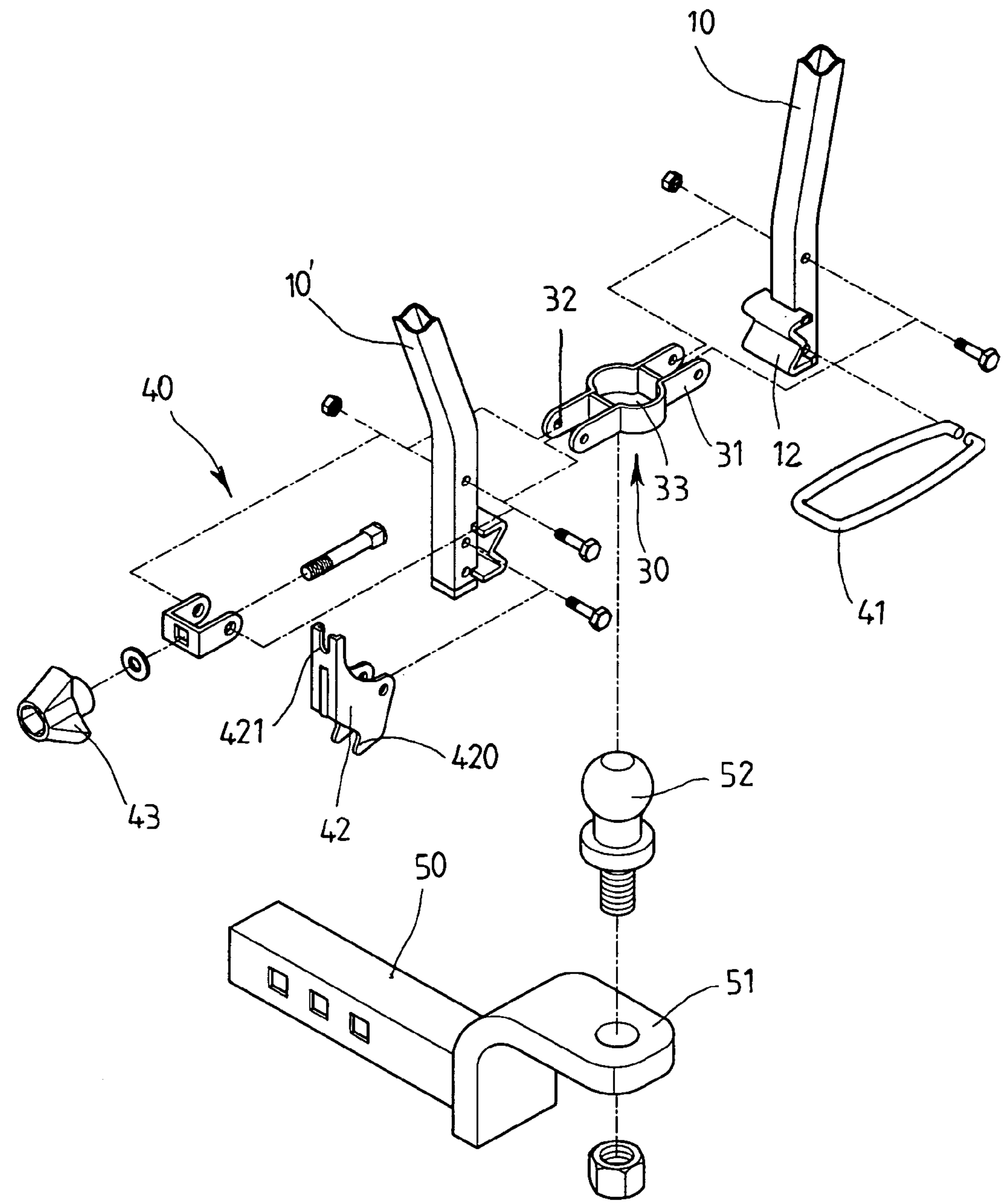
FIG. 2 is an exploded view to show the securing device of the present invention.
Figure 3:
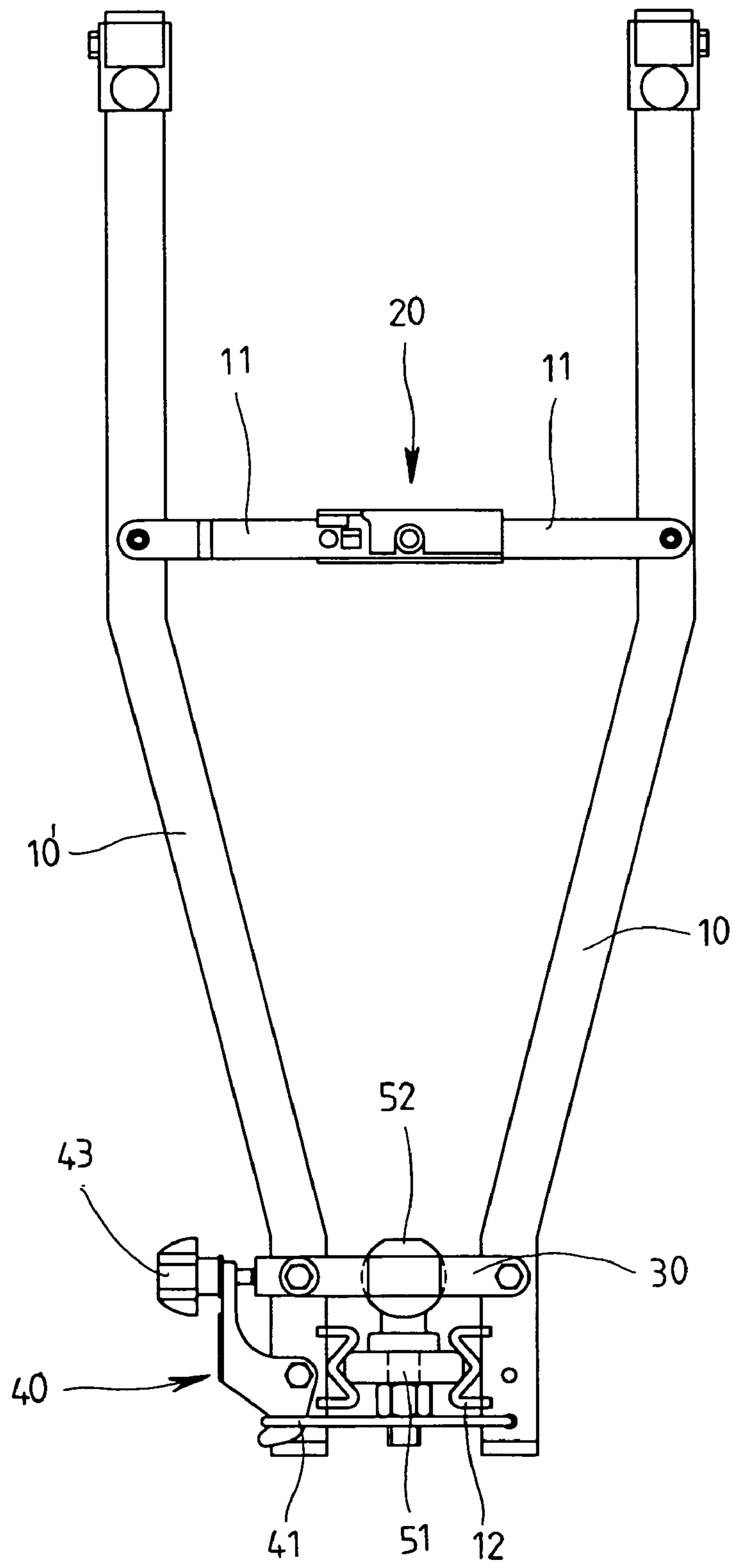
FIG. 3 is a front view to show the securing device holding the extension part and the sphere.
Figure 4:
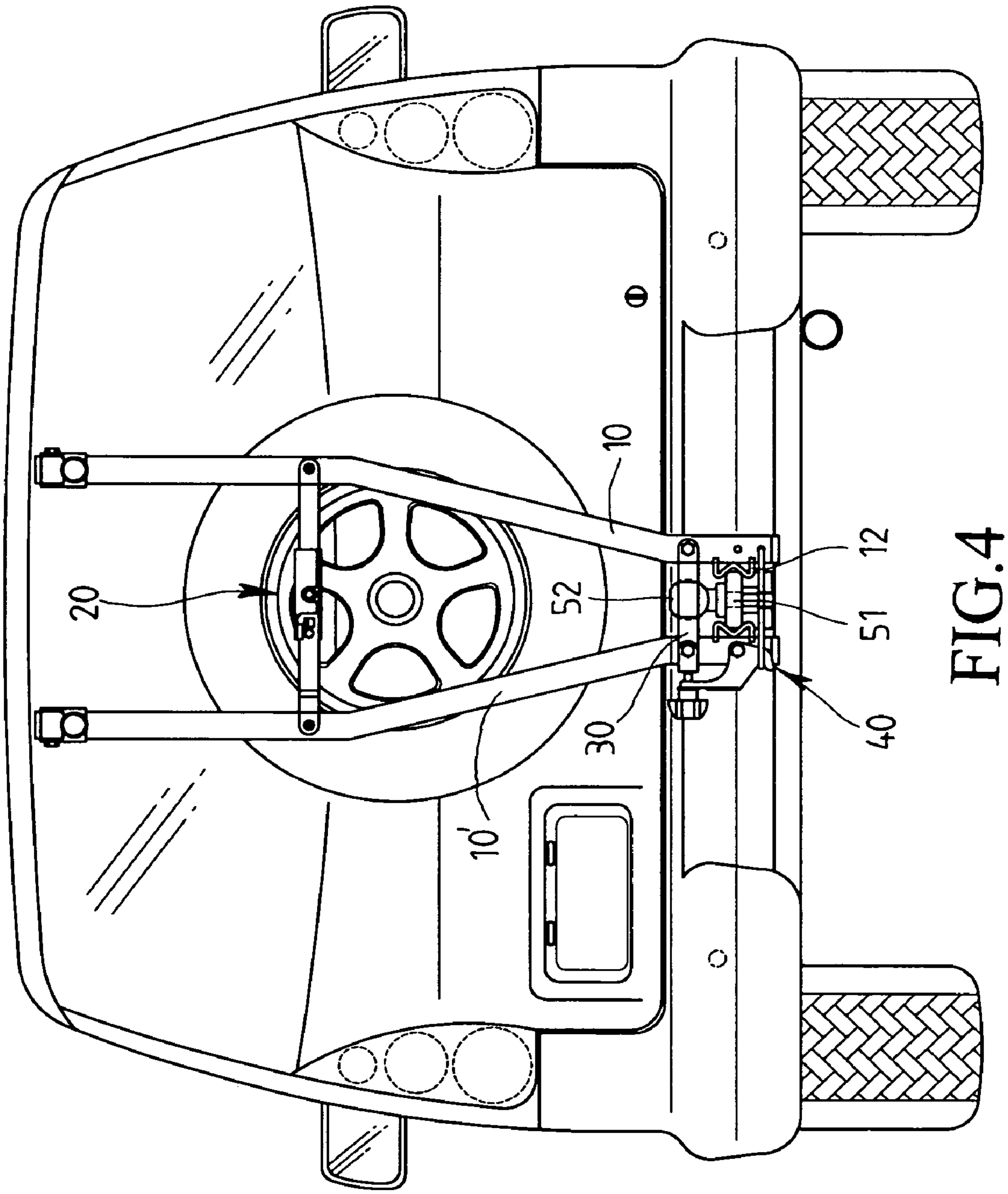
FIG. 4 shows the bicycle rack connected to a back of a vehicle.
Figure 5:
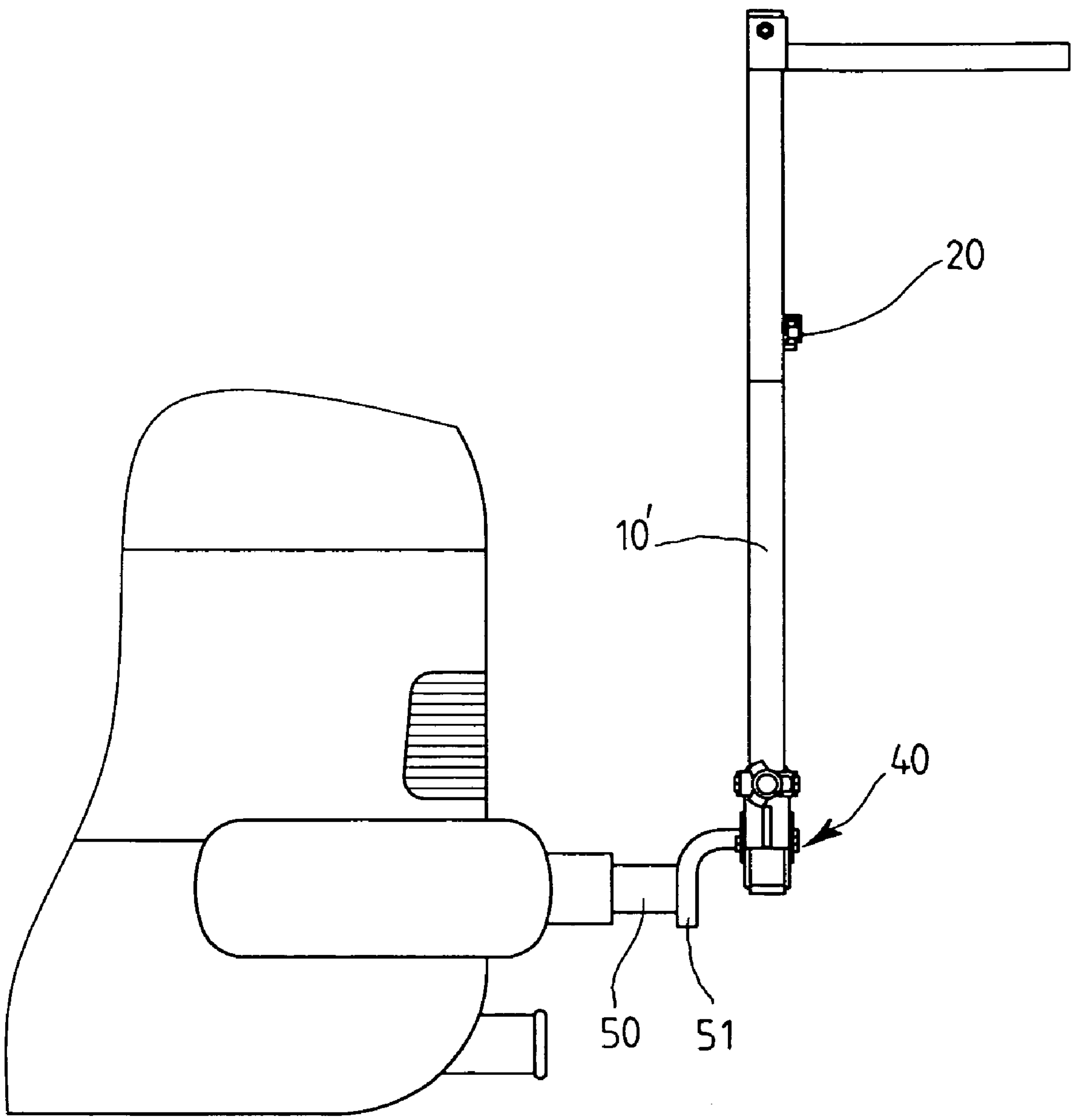
FIG. 5 shows a side view of the bicycle rack connected to the vehicle.
Figure 6:
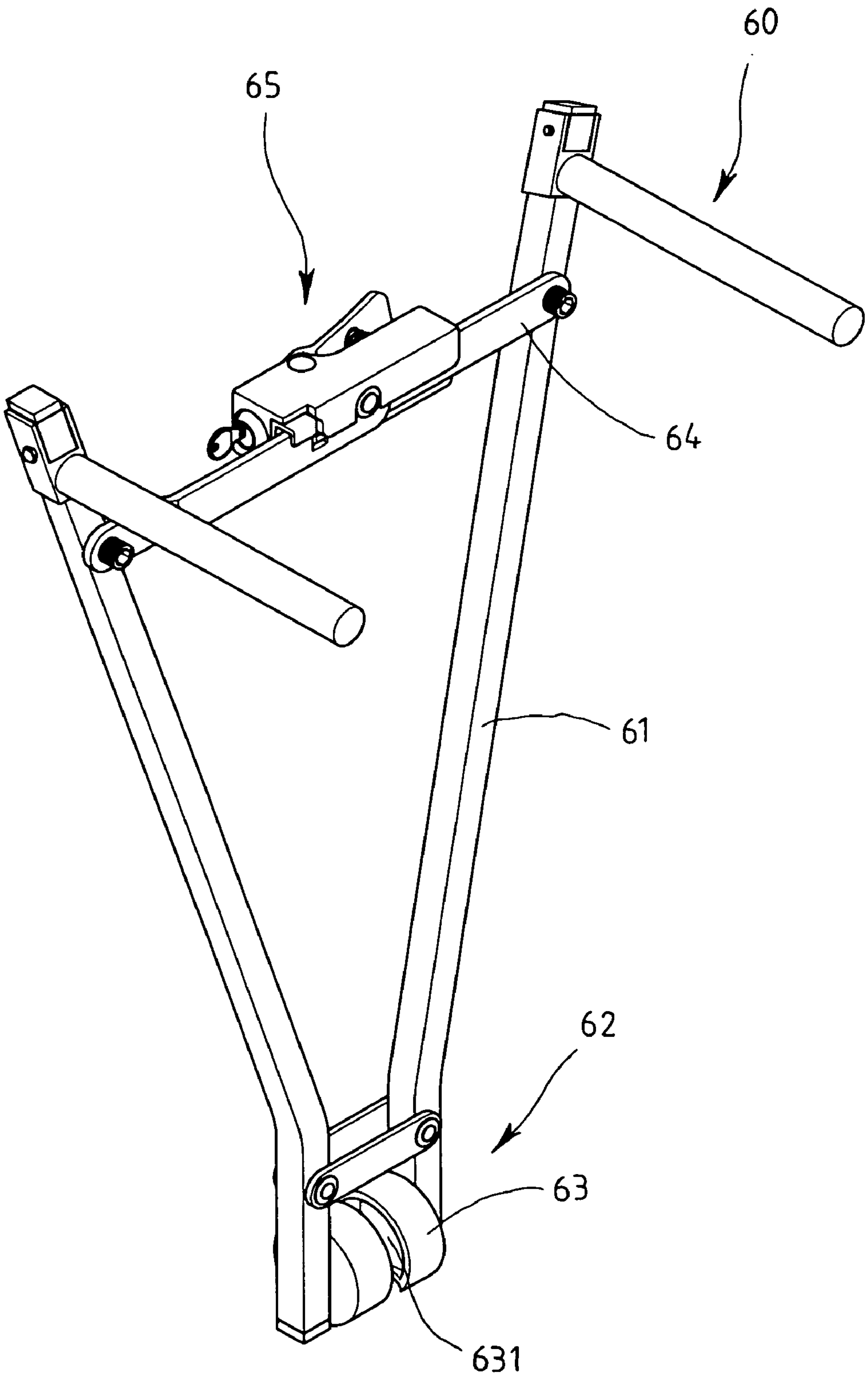
FIG. 6 is a perspective view to show a conventional bicycle rack.
Figure 7:
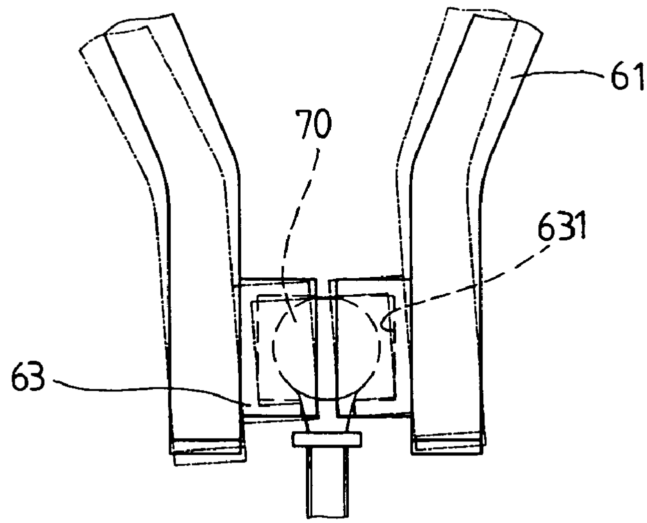
FIG. 7 shows the bicycle rack shakes during transportation.
Figure 9:
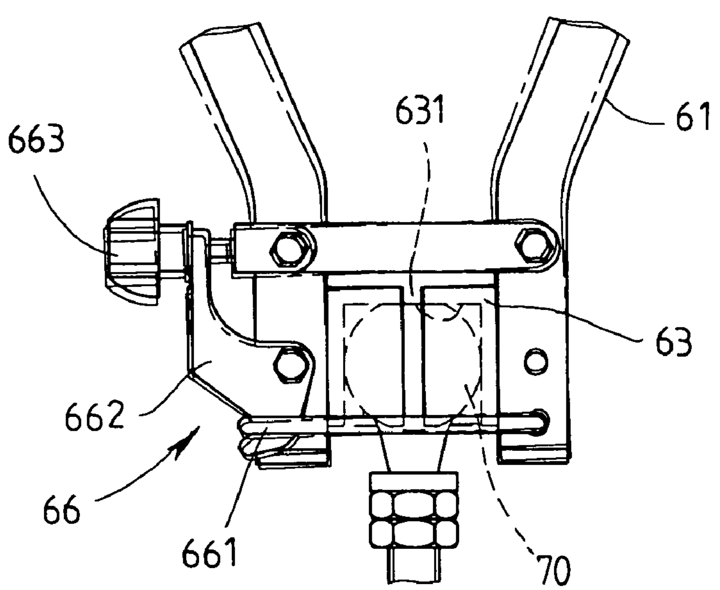
FIG. 9 shows the bicycle rack in FIG. 8 shakes during transportation.
Figure 8:
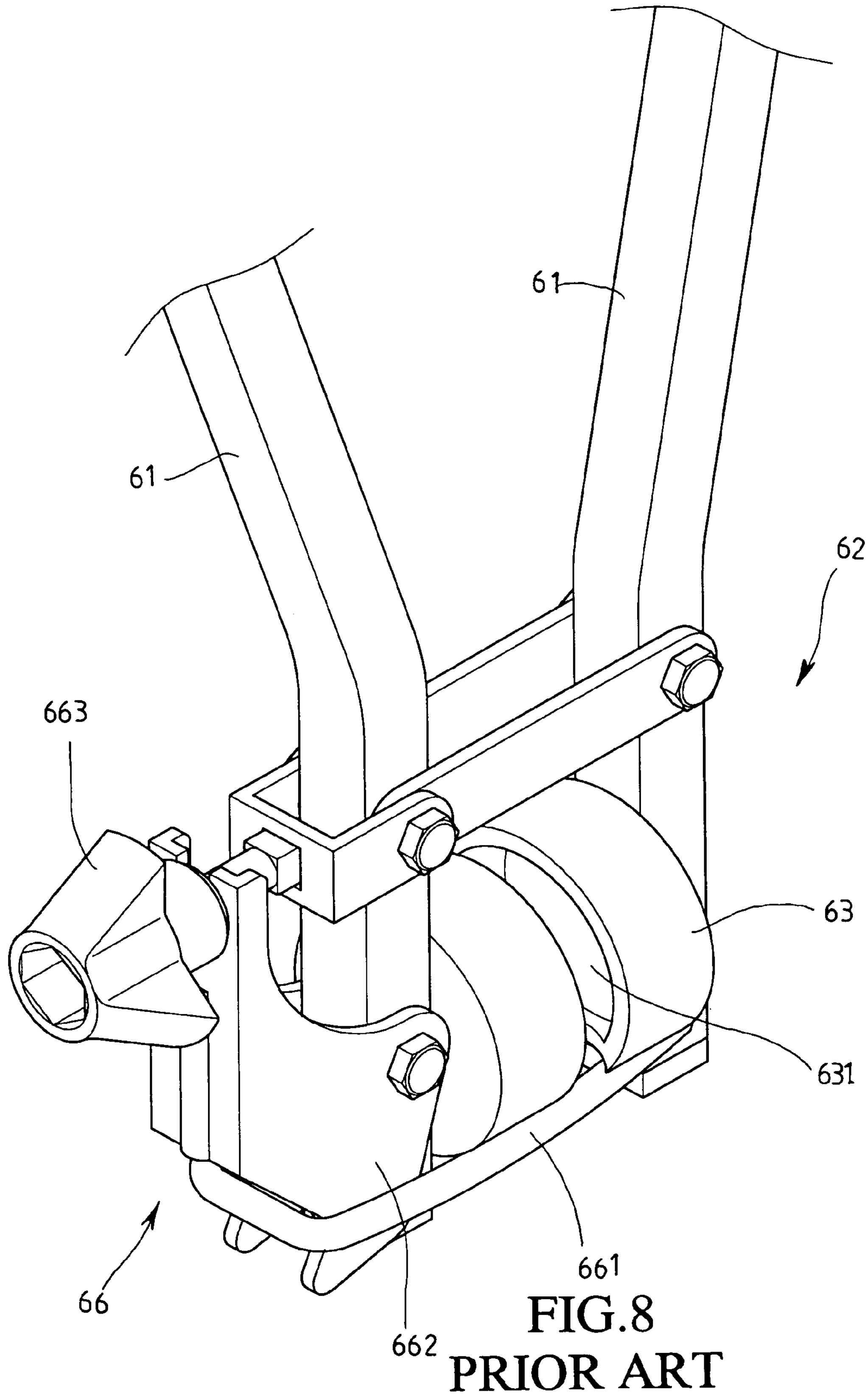
FIG. 8 a perspective view to show another embodiment of the conventional bicycle rack.

Referring to FIGS. 1 to 5, the bicycle rack of the present invention is connected to a sphere 52 on an extension part 51 which is connected to a bar 50 extended from a vehicle. The bicycle rack comprises a first tubes 10 and a second tube 10', and a support bar 100 extends from a first end of each of the first and second tubes 10, 10' so as to support bicycles (not shown) thereon. Two stretch plates 11 are connected between the first and second tubes 10, 10' and a locking device 65 locks the two stretch plates 11 to avoid the two stretch plates 11 from being folded or collapsed.

An M-shaped positioning member 12 is connected to an inside of a second end of each of the first and second tubes 10, 10'. Each positioning member 12 has a recess 120 which is located transversely to the first and second tubes 10, 10' and engage with the extension part 51. The extension part 51 is then clamped between the two positioning members 12.

A ring 41 is pivotably connected to the second end of the first tube 10 and a retaining member 30 is connected between the first and second tubes 10, 10'. The retaining member 30 includes a collar 33 and two lugs 31 extend from the collar 33 such that the lugs 31 are connected to the first and second tubes 10, 10' by extending bolts through holes 32 in each lug 31 and holes in the first and second tubes 10, 10'. The sphere 52 is embraced by the collar 33.

A holding member 42 has an intermediate point pivotably connected to the second tube 10' and a hook portion 420 is defined in an end of the holding member 42. The ring 41 is disengageably hooked to the hook portion 420. A bolt extends through a U-shaped frame which has two ends connected to the two lugs 31 on the second tube 10', and extends through a recess 421 defined in the other end of the holding member 42. A nut 43 is connected to the bolt so that when rotating the nut 43 to push the end having the recess 421 of the holding member 42, the hook portion 420 firmly pull the ring 41. This makes the two positioning members 12 close toward each other and holds the extension part 51 firmly.

The extension part 51 and the sphere 52 are respectively held by the two positioning members 12 and the collar 33 so that shaking of the bicycle rack can be effectively reduced.

While we have shown and described the embodiment in accordance with the present invention, it should be clear to those skilled in the art that further embodiments may be made without departing from the scope of the present invention.

What is claimed is:

1. A bicycle rack connected to an extension part from a vehicle and a sphere connected to the extension part, the bicycle rack comprising:

a first tube and a second tube, each of the first and second tubes having a support bar extending from a first end thereof and a positioning member connected to an inside of a second end of each of the first and second tubes, each positioning member having a recess engaged with the extension part, a ring pivotably connected to the second end of the first tube, two stretch plates connected between the first and second tubes;

a retaining member connected between the first and second tubes and including a collar which is adapted to embrace the sphere, and a holding member having an intermediate point pivotably connected to the second tube and a hook portion defined in an end of the holding member, the ring disengageably hooked to the hook portion, a bolt extending through the other end of the holding member.

2. The bicycle rack as claimed in claim 1, wherein each positioning member is an M-shaped member and the recess is located transversely to the first and second tubes.

* * * * *